Patented Dec. 31, 1929

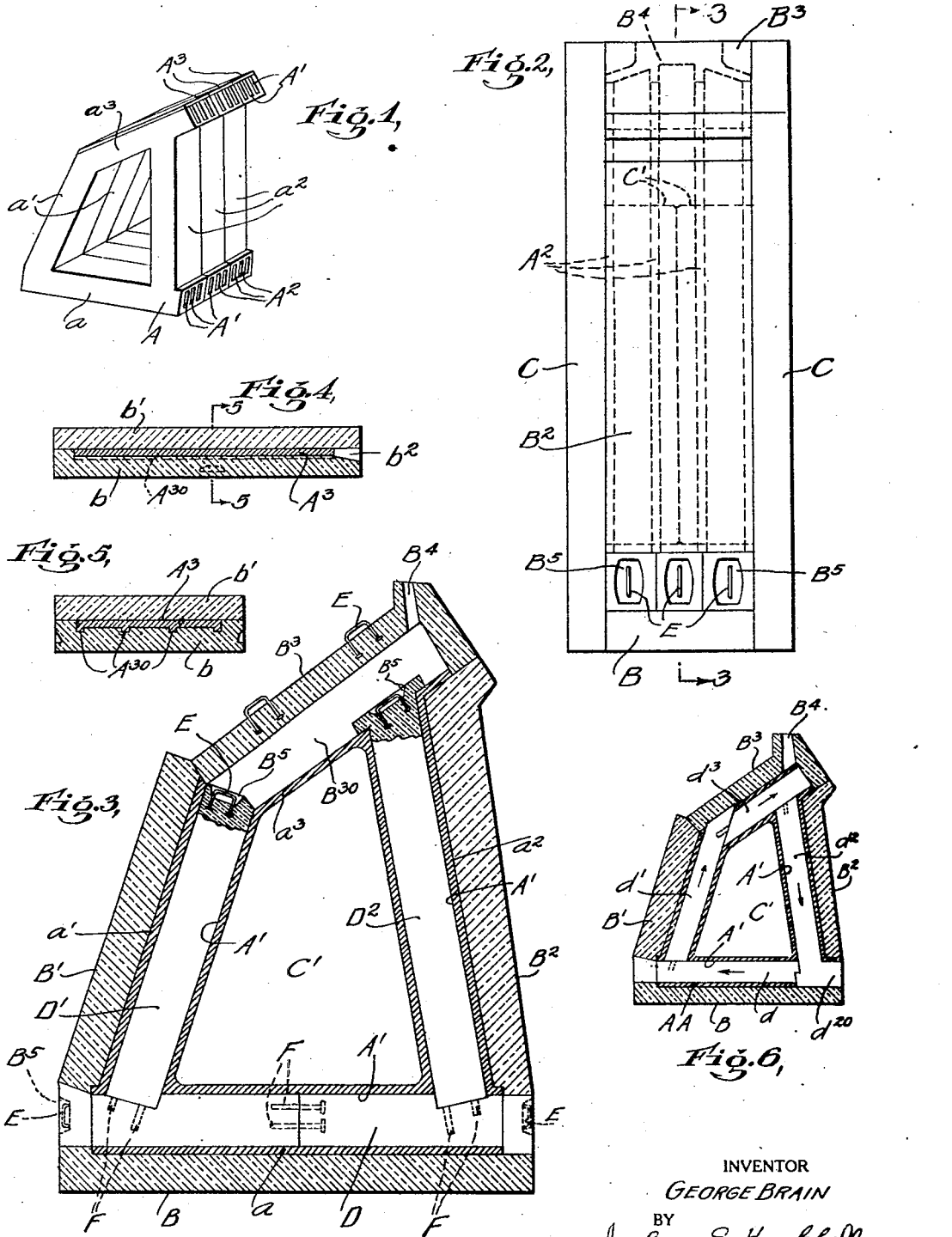

1,741,147

UNITED STATES PATENT OFFICE

GEORGE BRAIN, OF TIFFIN, OHIO, ASSIGNOR TO AMERICAN DRESSLER TUNNEL KILNS, INC., OF CLEVELAND, OHIO, A CORPORATION OF NEW YORK

COMBUSTION-CHAMBER CONSTRUCTION

Application filed May 10, 1926. Serial No. 107,880.

My present invention relates to the form and method of producing combustion chambers of the type used in heating tunnel kilns of the muffle type. As ordinarily constructed, the combustion chambers with which the present invention is concerned, are elongated hollow structures which extend longitudinally of the kiln chamber, and have flat bottom, side and top walls of fire clay carborundrum or analogous refractory material, and formed with channels extending transversely of the combustion chamber which provide flow paths through which a convection current circulation of the kiln atmosphere is set up. In accordance with the present invention, I form such combustion chambers in short end to end sections, each of which is formed in whole or in large part by one integral refractory body, and in the preferred mode of practicing the invention each such section is formed by a casting operation.

As heretofore constructed, such combustion chambers have ordinarily been composed of elongated rectangular bodies resembling ordinary hollow building tile in that they are made in an extrusion press and are formed with longitudinal perforations or channels extending transversely to the length of the combustion chamber as a whole. By forming the wall of larger sections each comprising portions entering into a plurality of the walls of the combustion chamber, the number of joints to be made and kept tight and the cost of assembly and maintenance are greatly reduced, in comparison with the wall construction heretofore employed.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described various modes of practicing the invention.

Of the drawings:

Fig. 1 is a perspective view of a portion of the combustion chamber constructed in accordance with the present invention;

Fig. 2 is an elevation of the mold in which the combustion chamber sections are cast;

Fig. 3 is a section on the line 3—3 of Fig. 2;

Fig. 4 is a section through the combustion chamber top plate mold;

Fig. 5 is a section on the line 5—5 of Fig. 4; and

Fig. 6 is a view taken similarly to Fig. 3 illustrating a modified combustion chamber form and the mold in which it is produced.

The tunnel kiln combustion chamber illustrated by way of example in Fig. 1, is an elongated horizontal body composed of integral transverse sections A, and roof members $A^3$ mounted one on top of each section A. Each combustion chamber section A comprises a bottom wall part $a$, an outer inclined side wall portion $a'$, a front inclined side wall portion $a^2$, and an inclined top wall or roof portion $a^3$. Each of the wall portions $a$, $a'$, $a^2$, and $a^3$ is formed with one or more, three as shown, channels $A'$, each of which extend transversely to the length of the combustion chamber and parallel to the plane of the wall portion in which it is formed. Each channel is elongated in cross section in a direction transverse to the length of the combustion chamber. Adjacent channels $A'$ in each section A are separated by relatively thin webs $A^2$. The channels $A'$ in the bottom portion $a$ of each section A are open at their opposite ends to the kiln chamber in which the combustion chamber is placed, and communicate adjacent their ends with the lower ends of the channels $A'$ in the walls $a'$ and $a^2$. The channels $A'$ in the roof portion $a^3$ communicate with the upper end of the channels $A'$ in the side wall portions $a'$ and $a^2$, and are open to the kiln atmosphere at their upper ends. The sides of the channels $A'$ are all enclosed by integral portions of the section A except the upper sides of the channels $A'$ in the roof wall portion $a^3$, which are closed by the corresponding roof member $A^3$, which, as shown, is formed with depending ribs $A^{30}$ which register with the ribs $A^2$ in the part $a^3$, so that the member $A^3$ forms not only the roof, but also portions of the sides of the channels A′ in the roof portion $a^3$ of the section A.

The combustion chamber sections A and members $A^3$ are preferably formed in accordance with the present invention by pouring a sufficiently fluid mixture of fire clay or the like refractory material and water into a suitably shaped mold in which the parts are thus cast. The parts thus cast after drying sufficiently in the molds, are withdrawn from the latter, and are then fired. In the mold for the sections A illustrated in Figs. 2 to 5, the outer wall of the mold is formed by separate slab-like bodies B, B′, $B^2$ and $B^3$, and by the heads or core print portions C of end to end core bodies C′ which form the inner wall of the mold cavity. The channels A′ in the portions $a$, $a'$ and $a^2$ of the section A are formed by core bars D, D′ and $D^2$, respectively. The channels A′ in the roof or top wall portion $a^3$ of the section are formed by corresponding depending rib portions $B^{30}$ on the mold part $B^3$. The latter is formed with a suitably shaped and disposed pouring gate $B^4$.

It will be understood, of course, that the core bars and channel forming ribs of the mold body part $B^3$ should be formed with sufficient draft or taper to permit their ready removal of the cores after the casting formed about them has hardened. Conveniently, as shown, each core bar D is formed of two end to end sections which in the assembled mold are held together by dowel pins F, and are tapered so that each part of each core bar D may be withdrawn from the corresponding end of the channel A′ which it defines. The core bar parts D′ and $D^2$ are tapered so that they may be pulled up out of the channels which they form after the top mold part $B^3$ is removed. The mold and core parts may be formed of plaster of Paris with reinforcing provisions, as is usual practice in casting clay products, the water absorbing capacity of plaster of Paris being utilized to absorb water from the material poured into the mold cavities. As shown, the various core bar parts are provided with handles E anchored in the core bars and advantageously having their exposed parts received in depressions $B^5$ formed in the corresponding ends of the core bodies. To facilitate the proper assemblage of the parts, the core bar parts D′ and $D^2$ have their ends shaped to fit against correspondingly shaped seats formed on the core bar parts D, and on the mold part $B^3$, and at their lower ends the core bars D′ and $D^2$ are provided with dowel pins F which enter dowel pin holes in the core bars D. The combustion chamber roof members $A^3$ are formed as shown in Figs. 4 and 5, in molds comprising mold parts $b$ and $b'$, $b^2$ representing the pouring gate for this mold.

Combustion chambers composed of sections formed as described above, obviously involve a substantially smaller number of parts than are required when each wall of the combustion chamber is formed of such separate longitudinally channelled bar-like parts extending transversely to the length of the combustion chamber as have heretofore been ordinarily employed in combustion chambers of the type shown in Fig. 1. This decrease in the number of parts required materially reduces the cost and labor of assembling the combustion chambers, particularly as it is ordinarily necessary to manually break away portions of the bar-like parts in order to properly assemble the composite structure and to secure the necessary communication between the atmosphere circulating channels in the different walls of the combustion chamber. Furthermore, the material reduction in the amount of joint surface obtained with my invention as compared with prior constructions minimizes the tendency to joint leakage, and materially reduces the assembly and maintenance cost required to prevent joint leakage from becoming excessive.

It will be apparent, of course, that the invention is capable of use in producing combustion chambers differing in form from that illustrated in Figs. 1 to 5, and that the molds employed may vary in form. In Fig. 6, for example, I have illustrated a construction in which each longitudinal section of the combustion chamber is formed by a single casting AA of fire clay or other refractory material. In Fig. 6, the major portions of the channels in the bottom portion of the section AA are formed by a core bar $d$ and the remaining portions of the chambers are formed by portions of the inner wall core bar parts $d^2$ which extend and are withdrawn through the bottom of the mold. The body portions of the bars $d$ extend through and form portions of the bottom channels A′, and the inner ends of the bottom wall channels are formed by lateral projections $d^{20}$ of the core bar parts $d^2$. In Fig. 6, the top wall channels A′ are formed by core bar parts $d^3$ which are removed from the mold by moving them in a longitudinal direction away from the core bar parts $d'$ which form the channels A in the outer inclined wall of the combustion chamber. The core bar parts $d'$ are withdrawn from the casting by moving them upward after the top part $B^3$ of the mold is removed.

Except for the omission of channel forming ribs from the top part $b^3$, and such obvious differences in shape as are required to accommodate the modified core bar constructions, the mold body of Fig. 6 is composed of sections substantially like the corresponding sections of the construction first described. The combustion chamber section AA formed as illustrated in Fig. 6, differs from that shown in Figs. 1 to 5, primarily in that the top walls of the roof channels A' are closed by integral portions of the casting, and in that openings are formed in said top walls in register with the upper ends of the channels A' in the outer inclined wall of the section. These openings may be closed by laying flat tiles over them if necessary or desirable, but ordinarily it is not really material whether those openings are closed or open. The core bars $d^2$ form openings in the bottom walls of the channels A' in the bottom wall portion of the section AA, but there is no necessity whatever for closing those openings, particularly as they are ordinarily closed in any event by the kiln bench or horizontal wall portion on which the combustion chamber rests.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. As a new article of manufacture, an integral part of non-metallic refractory material adapted to form the major portion at least of a longitudinal section of an elongated combustion chamber and formed with channels in its walls adapted to receive fluid absorbing heat from the walls of said channels.

2. As a new article of manufacture, an integral casting of non-metallic refractory material adapted to form the major portion at least of a longitudinal section of an elongated combustion chamber and formed with channels in its wall adapted for the circulation of a fluid absorbing heat from the walls of said channels.

3. A horizontally elongated combustion chamber composed of separate longitudinal sections the major portion at least of which consists of an integral part of non-metallic refractory material formed with channels in its walls for the passage of an atmospheric fluid heated by combustion occurring within the combustion chamber.

4. A horizontally elongated combustion chamber composed of separate longitudinal sections each of which is formed in major part at least by a single casting of non-metallic refractory material formed with channels in its wall for the circulation of an atmospheric fluid heated by combustion occurring within the combustion chamber.

5. A horizontally elongated combustion chamber composed of separate longitudinal sections, each of which is formed of two cooperating parts which unite to provide a plurality of combustion chamber wall portions jointly enclosing the combustion chamber space, with channels in said wall portions extending transversely to the length of the combustion chamber and open to the surrounding atmosphere adjacent the top and bottom of the combustion chamber, some of said channels being formed partly in one and partly in the other of the two parts of each section.

6. A mold for casting a refractory non-metallic combustion chamber wall part comprising separable mold parts defining a mold cavity including a combustion chamber bottom wall portion and combustion chamber side wall portions, core bar parts extending across the bottom wall portion of the mold cavity, and core bar parts interlocking with the first mentioned core bar parts and extending transversely to the latter through the side wall portions of said mold cavity.

7. A mold for casting a refractory non-metallic combustion chamber wall part comprising separable mold parts defining a mold cavity including a combustion chamber bottom wall portion and combustion chamber side wall portions, core bar parts extending across the bottom wall portion of the mold cavity, and core bar parts interlocking with the first mentioned core bar parts and extending transversely to the latter through the side wall portions of said mold cavity, the first mentioned core parts being formed in separable end to end sections.

8. A mold for casting a non-metallic refractory combustion chamber part comprising separable mold parts uniting to form a mold cavity comprising a combustion chamber bottom, top, and opposed side wall portions, and interlocking core bar parts extending across the bottom, top and side wall portions of the mold cavity and cooperating to form communicating channels in the different wall portions of said part.

Signed at Tiffin in the county of Seneca, and State of New York, this 5th day of May, A. D., 1926.

GEORGE BRAIN.